July 30, 1968   B. B. MECKEL   3,395,090
METHOD OF DETERMINING CRYSTAL GRAIN ORIENTATION
BY COMPARING SPUTTERED PATTERNS
Filed May 28, 1965   2 Sheets-Sheet 1

INVENTOR.
BENJAMIN B. MECKEL
BY Carl R. Brown
ATTORNEY

July 30, 1968  B. B. MECKEL  3,395,090
METHOD OF DETERMINING CRYSTAL GRAIN ORIENTATION
BY COMPARING SPUTTERED PATTERNS
Filed May 28, 1965  2 Sheets-Sheet 2

INVENTOR.
BENJAMIN B. MECKEL
BY Carl R. Brown

ATTORNEY

United States Patent Office 3,395,090
Patented July 30, 1968

3,395,090
METHOD OF DETERMINING CRYSTAL GRAIN ORIENTATION BY COMPARING SPUTTERED PATTERNS
Benjamin B. Meckel, La Mesa, Calif., assignor to Physics Technology Laboratories, Inc., La Mesa, Calif., a corporation of California
Filed May 28, 1965, Ser. No. 459,840
7 Claims. (Cl. 204—192)

This invention relates to a crystal orientation projector and more particularly to a crystal orientation projector that uses sputtering techniques to project the crystal grain preferred orientation of metals, dielectrics and the like and the lattice orientation of single crystals.

The production control involved in making sheet metals such as sheets of steel, aluminum and other metallic materials and in making sheets of bi-metallic material such as from semi-conductor material, requires extensive and highly specialized inspection techniques. One important property of such materials that may be used in such inspection techniques is the crystal grain preferred orientation of the material. The industrial importance of this preferred orientation is in the macroscopic properties of sheet materials. Given the fact that most single crystal materials are anisotropic, that is they have different properties in different directions, it follows that when an aggregate of single crystals or grains in the metal have a preferred orientation, then the metal will have directional properties. Such properties in sheet materials are usually objectionable. Hence it is necessary for sheet material manufactures to use extreme care in the recognition, evaluation and control of this physical property.

Preferred orientation of the single crystals or grains also exists in many casts, pot dipped coatings, thin films, altered deposits layers, and other metallurgical products, and also in fibers, in sheets, and in organic and non-organic aggregates. In fact, preferred orientation is generally the rule and not the exception and the formation of aggregates with a completely random single crystal or grain orientation is a difficult matter. To a certain extent, through proper controls, preferred orientation in metallurgical products can be advantageously used for many requirements. The strength of metal, its brittleness, malleability and other many characteristics can be controlled by the correct choice of a proper degree of deformation, annealing, temperature, and annealing time, if such characteristics can be appropriately established and checked from time to time in the making of such materials.

The recent increase in use of single crystals and the concurrent improvement in techniques for growing such single crystals has increased the need for apparatus that determines the alignment of the lattice of the crystal. Single crystals have atoms arranged in a lattice and depending upon the particular crystal, the lattice may be cubic or it may have 6 sides, 8 sides, etc. An important consideration is the alignment of the single crystal lattice and whether it is tipped or how positioned relative to the elongated shape of the single crystal that was grown on a rod or the like. The particular lattice alignment determines the direction the atoms will be ejected during sputtering.

The preferred orientation of metals is a crystallographic condition and generally has no relationship with grain shape as disclosed by a microscope. Rather the grains are individual single crystal particles that in combination form the metal. These single crystal elements may have any of several physical orientations relative to one another. When the group orientations of the grains have a pattern, then this pattern is the crystal grain preferred orientation. It is therefore impossible to use microscopic methods to disclose or determine preferred orientation.

Before my invention, only one effective device existed for determining the crystallographic condition and that device or technique used X-ray defraction techniques. X-ray defraction techniques have been used many years, however, such techniques are limited in application and X-ray films often require exposure times of several hours. In the Laue photographic method for example, several X-ray films are taken and subsequently projected on a single stereographic plot. Each X-ray film requires several hours exposure time and require successive intricate displacement of the sample in order to obtain full stereographic projection. The entire procedure requires 8 to 10 man hours of highly scientific skill and the use of fairly involved, expensive and complicated equipments. It is believed that a simpler and more rapidly useable method and device is necessary.

It is therefore an object of this invention to provide an improved and novel method and apparatus for determining crystal orientation of materials that are capable of being sputtered.

It is another object of this invention to provide an improved and novel crystal orientation projector that is capable of obtaining and projecting the crystal grain orientation or the crystal lattice alignment in a quick, easy and efficient manner.

It is another object of this invention to provide a crystal orientation projector that is simple in construction, easy in operation and inexpensive in cost.

As further background for this invention, a physical phenomena occurs when ions bombard solid surfaces, a process known as sputtering. Under bombardment the neutral atoms of solids are driven from the surface in preferred directions. It has been found that these preferred ejection directions follow close-packed lines that are in alignment with the lattice of the atoms in the crystals. The close packed lines are uniquely characteristic of certain metal crystal structures and alloy structures, and when the atoms are deposited on a transparent medium in sufficient amounts, the deposits display discernable characteristics. In the case of single crystals, the collection of the ejected or sputtered atoms form discrete build-ups of metal deposits on the transparent collection plates placed around the crystal surface. From the collection plates it is possible to plot precise pole figures or orientations in a very short time.

The method and apparatus of this invention utilizes the aforesaid principles to obtain projectable patterns of the crystal orientation of the material being tested. The sample to be tested is placed in or against a vessel that is then evacuated. RF coils pass through the vessel and when energized create plasma in the vessel by ionizing the small amount of air or gas remaining in the vessel, cylinder, or projector. The plasma has a given positive potential. A target of the material to be tested has a lower potential. Accordingly the positive ions of the plasma bombard the surface of the sample. This bombardment causes atoms of the material to be ejected from the surface of the material with substantially no identifying charge and in a direction predetermined by the crystal grain orientation. After a period of time the sputtering produces discrete deposits of the sample material on certain areas of the inner surface of the vessel. One surface being a transparent plate. After a given time the transparent plate will have collected a sufficient deposit of the sample material from which the position, size, and definition of these spots will show preferred orientation information.

Further details and features of the invention will appear in the following description of embodiments as illustrated in the accompanying drawing and in which, FIGURE 1 is a schematic view of the combination of parts in the apparatus of this invention.

Figure 1:
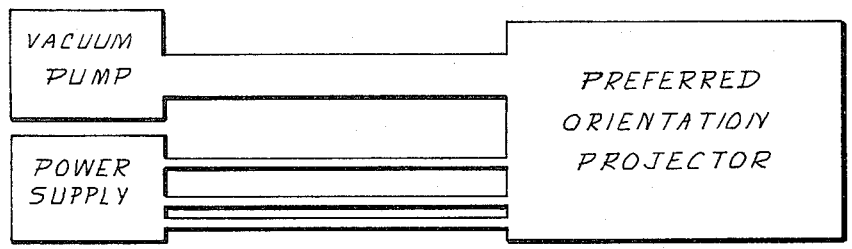
Figure 2:
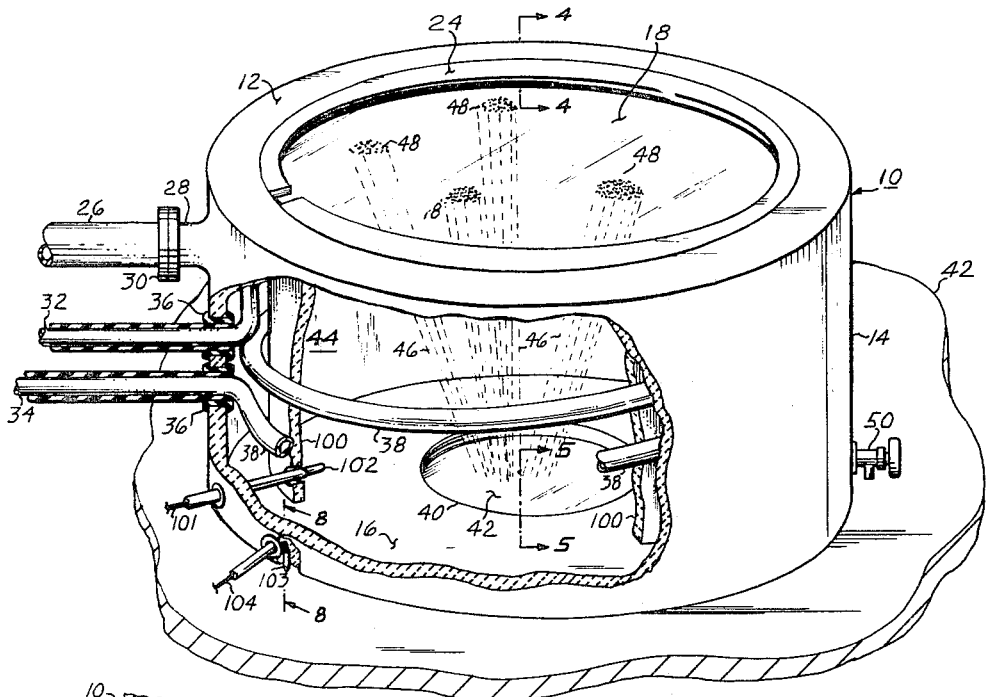
FIGURE 2 is a view partly in section of an embodiment of this invention for obtaining projectable deposits of sputtered atoms from a sheet of test material.
Figure 8:
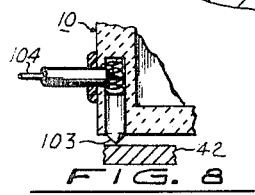
FIGURE 8 is a view of the ground conductor connection.

Referring now to FIGURES 1 and 2, an embodiment of this invention comprises a preferred orientation projector device that utilizes a vacuum pump, a source of radio frequency current, and a source of direct current having a potential in the order of around 2000 volts. The vacuum pump draws a vacuum in the enclosed vessel of the orientation projector and a power supply provides RF and DC voltage to the vessel 10 as shown in FIGURE 2.

Figure 4:
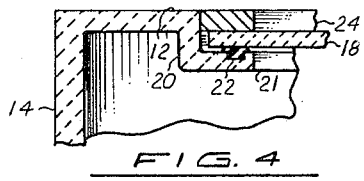
FIGURE 4 is a cross-sectional view taken along lines 4—4 of FIGURE 2.
Figure 5:
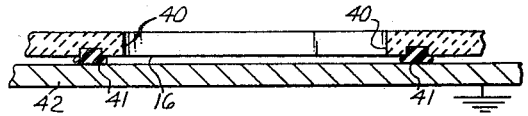
FIGURE 5 is a cross-sectional view taken along lines 5—5 of FIGURE 2.

The preferred orientation projector in FIGURE 2 has a generally cylindrical shape with a cylindrical wall 14 and a flat bottom 16 and top 12. The cylindrical and bottom member 16 may be made of an insulator, such as machineable ceramic, or if desired, the bottom member 16 may be made of an insulator and wall 14 made of metal. The upper or top surface 12 has an opening with a shoulder 20 (see FIGURE 4). The shoulder 20 forms a ledge 21 having an O ring 22 receiving groove. Removably positioned on the ledge 21 is a transparent circular disk 18 that is locked in position by spring latch 24. The transparent disk may be made of glass or of an appropriate heat-resistant, transparent plastic. Container or vessel 10 in operation has a vacuum drawn therein that creates a suction on plate 18 drawing it in against the O ring 22 with sufficient force to seal the opening in the top 12 and prevent leakage that would cause major loss of vacuum. Bottom plate 16 also has an aperture 40 therein (see FIGURE 5) that opens the vessel 10 to the sample to be tested. The outer surface of the bottom plate 16 adjacent aperture 40 has a recess or O ring 41 that fits between the bottom surface 16 and the test sample 42 sealing the opening 40 against major loss of vacuum.

Inside the vessel there is positioned a spiral tubing 38 of copper or like material that is positioned concentrically and just inside the inner surface of the cylindrical wall 14. An insulating cylindrical member 100 is placed inside the spiral conductor, leaving an open space in the center of the vessel as shown. The spiral conductors 38 carry the RF current that is received from cables 32 and 34. Insulating shaped rings 36 insulate the RF power cables from contact with the cylindrical wall and also form packing seals for preventing major loss of vacuum through the openings. A connecting tube 28 has a mating flange that is joined with flange 30 that is attached to the end of the flexible vacuum hose 26. The vacuum is drawn in the vessel through hose 26. Nozzle 50 allows the vacuum to be broken when desired.

Figure 6:
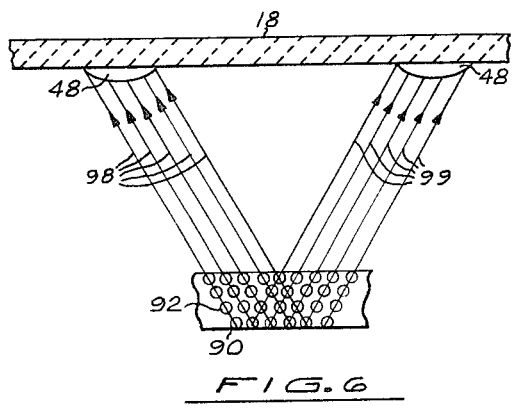
FIGURE 6 is a schematic representation illustrating the preferred ejection directions of lines of atoms that are sputtered from a single crystal material.
Figure 7:
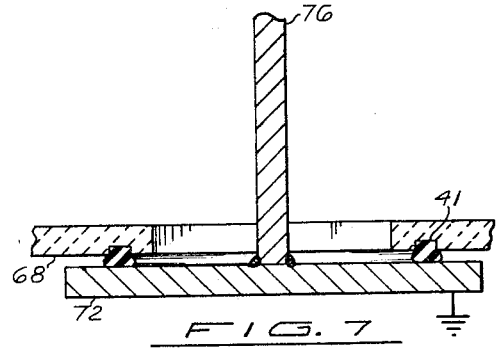
FIGURE 7 is a cross sectional view taken along lines 7—7 of FIGURE 3.

In operation a sheet of material 42 to be tested is placed adjacent the aperture 40 of the vessel 10 or the vessel 10 is placed firmly on a sheet 42. The O ring seal 41 is squeezed therebetween when the vacuum is drawn in the vessel 10. The transparent plate 18 is placed over the opening in the top of the container 12 and a seal is made by O ring 22. The transparent plate is clasped into position. The vacuum pump draws the air out of the vessel or container 10 to an evacuation of approximately $10^{-3}$ millimeters of mercury. When this is accomplished, the RF voltage is applied through in-put cables 32 and 34 to the coils 38. The RF energy ionizes the remaining air or gas in the vessel 10 creating plasma in the volume 44. A positive potential of about 2,000 volts is applied to this plasma from the direct current power supply through conductor 101 and electrode 102. The target or sample to be tested 42 is connected to ground potential through contact 103 and conductor 104. Thus a potential differential of about 2,000 volts exists between the plasma and plate 42. The positive ions in the plasma move to the lower potential with sufficient force to bombard the sample surface. This bombarding of the sample surface causes atoms to be ejected along paths 46 from the sample surface. These atoms are neutral and follow the ejection directions of others of the closely packed atoms in orientation with the crystal structure of the sample. As illustrated in FIGURE 6, in a single crystal structure 90 the atoms 92 in their aligned orientation or lattice will eject atoms in directions substantially shown by lines 98 and 99 which conform to the alignment or lattice of the atoms. The directed atoms will after a period of time build up into discrete material deposits 48 on the collection plate 18. The position, size and definition of these discrete deposits 48 of material can be used to indicate or determine the crystal grain preferred orientation.

Figure 3:
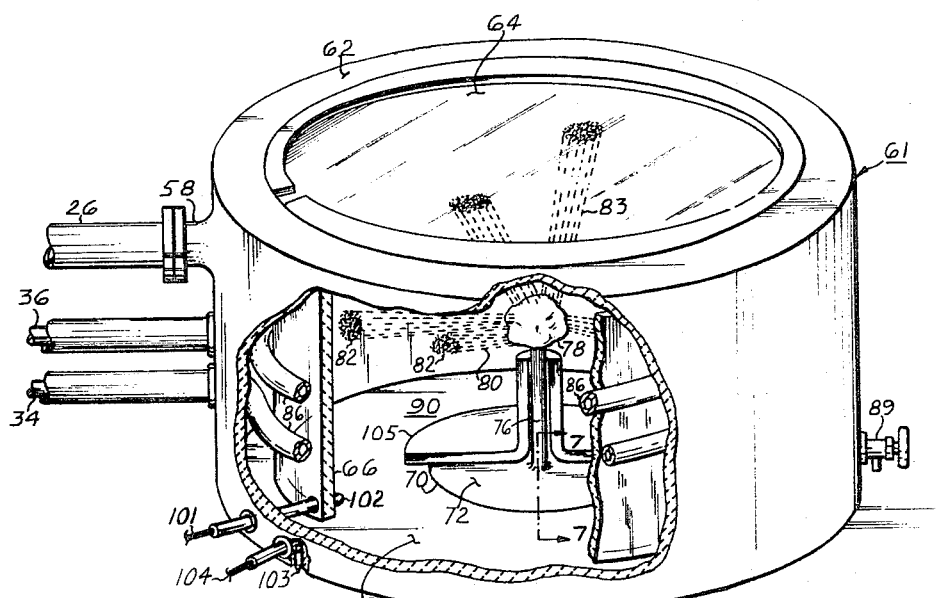
FIGURE 3 is a view partly in section of an embodiment of this invention for obtaining projectable deposits of sputtered atoms from a single crystal material.

Referring now to FIGURE 3, there is shown another embodiment of the invention that is modified to obtain single crystal lattice orientation deposits. In this embodiment a cylindrical vessel 61 that corresponds to the cylindrical vessel 10 of FIGURE 2, has the same top and bottom construction as was previously described. A transparent member 64 is placed into the opening of top 62 and sealed by the same O ring arrangement. With the exception of the mounting of the crystal and the insertion of the transparent cylindrical member 66 into the cavity of the vessel or container 61, the construction of the apparatus of FIGURE 3 is identical to that of FIGURE 2. In FIGURE 3, a transparent cylindrical member 66 of glass, heat-resistant plastic or the like is placed in the coils 86 in the vessel and on the bottom plate 68, for a purpose as will be more apparent hereinafter. The sample is not a sheet of material but rather a single crystal material 78 that is mounted on a conducting rod 76 that may be welded, brazed or otherwise fixed to and supported by plate 72. Plate 72 is connected to ground and forms a seal against the O ring 41. Plate 72 and rod 76 are covered by a funnel shaped insulator 105 that substantially eliminates bombardment of the rod by the positive ions.

In operation, the air is withdrawn through pipe 58 evacuating vessel 61. RF power is again provided to RF coils 86, and a 2,000 volt direct current potential is provided to electrode 102. A plasma is created from RF ionizing break-down of the remaining gas in the vessel. The single crystal 78 being at ground potential through conductor 76 is bombarded by the ions in the plasma that has a potential of about 2,000 volts. This as previously described causes atoms to be ejected therefrom in preferred ejection directions of closely packed lines of atoms that reflect the lattice orientation of the single crystal. The single crystal ejects groups of atoms in all the 360° directions such as 80, 82 and 83 giving additional deposits in the added dimension.

After the transparent members of FIGURES 1 and 3 have received the deposited atoms, the members may then be removed from the apparatus and projected or otherwise inspected against other test patterns facilitating the determination of the important properties of crystal lattice orienation.

Although I have described preferred embodiments of my novel invention many variations and modifications will now be obvious to those skilled in the art, and I prefer therefore to be limited not by the specific disclosure herein but by the appended claims.

I claim:

1. The method of displaying the crystal grain orientation of the surface of a sample material having a crystal grain orientation comprising, placing said material in a substantially evacuated environment so that the surface thereof faces in a certain direction, positioning a display plate to substantially face said surface, conducting radio frequency energy through said environment at a potential higher than said surface causing sputtering of said surface and eject atoms therefrom in at least one path determined by the crystal structure of said material, obtaining a display of the path of atoms ejected from said surface and comparing said display with a standard test pattern to determine the properties of the crystal grain orientation.

2. The method of claim 1 wherein said plate is transparent.

3. The method of claim 1 wherein said standard test pattern is prepared by a similar sputtering procedure.

4. The method of claim 1 wherein said surface is flat.

5. The method of displaying the crystal orientation of a single crystal material comprising, placing said single crystal material having a plurality of crystal faces in a substantially evacuated environment, positioning display surfaces opposite a plurality of said faces, conducting radio frequency energy through said environment at a potential higher than said material causing sputtering and to eject atoms therefrom in at least one path determined by the crystal structure of said single crystal, and obtaining a display of said crystal orientation, by intercepting in a plurality of planes, atoms ejected from said surface and comparing said display with a standard test pattern to determine the properties of the crystal orientation of said material.

6. The method of claim 1 wherein said display surfaces are provided by transparent bodies.

7. The method of claim 5 wherein said standard test pattern is prepared by a similar sputtering procedure.

References Cited

UNITED STATES PATENTS

| 3,021,271 | 2/1962 | Wehner | 204—192 |
| 3,087,838 | 4/1963 | Lubin | 204—192 |
| 3,210,263 | 10/1965 | Jones | 204—298 |
| 3,309,302 | 3/1967 | Heil | 204—192 |

ROBERT K. MIHALEK, *Primary Examiner.*